J. Du Bois,

Cotton Gin.

No. 4,047. Reissued June 28. 1870.

Witnesses
Henry J. Street
Jas. Allen

John Du Bois Inventor
Joseph G. Du Bois Assignee
by Theodor Munger
his Attorney

M. PETERS, PHOTO-LITHOGRAPHER, WASHINGTON, D. C.

UNITED STATES PATENT OFFICE.

JOSEPH C. DU BOIS, OF MILLERTON, CAL., ASSIGNEE OF JOHN DU BOIS.

IMPROVEMENT IN COTTON-GINS.

Specification forming part of Letters Patent No. 20,051, dated April 27, 1858; Reissue No. 4,047, dated June 28, 1870.

*To all whom it may concern:*

Be it known that I, JOSEPH C. DU BOIS, of Millerton, in the county of Fresno and State of California, (assignor of the entire interest of the patent granted to JOHN DU BOIS for improvement in cotton-gin ribs, Letters Patent No. 20,051, dated April 27, 1858,) hereby declare that the said JOHN DU BOIS did invent certain new and useful Improvements in Cottin-Gin Ribs, of which the following is the amended specification.

My invention consists in the construction, arrangement, and operation of a semi-hexagonal flange or projection on the face of the rib at the point where the seed, while being ginned, are discharged to prevent their falling out before the lint is taken off, and to discharge them as soon as this is accomplished, and thereby increase the quantity of cotton ginned in a given time. The flange may be of any desired length, or a second flange may be used. When extended to where the saw will meet it, or when a second flange is used at that point, it prevents the saw from being dulled by hulls, stems, &c., in poorly-picked cotton, and cotton having longer staple than usual may be ginned without breaking its fiber.

Figure 1:
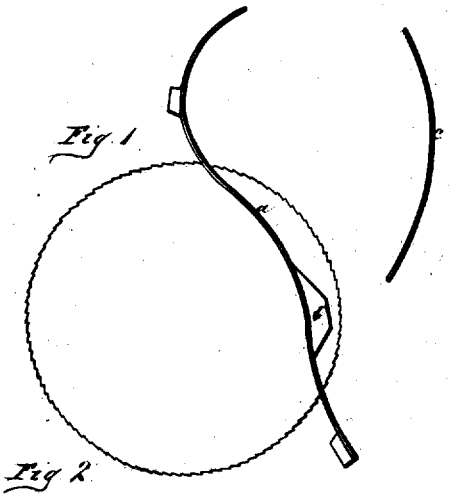
Figure 2:
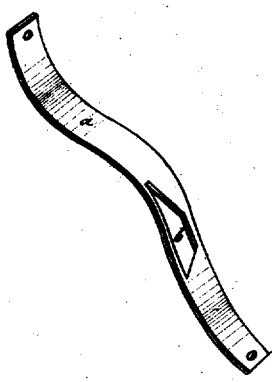
Figure 3:
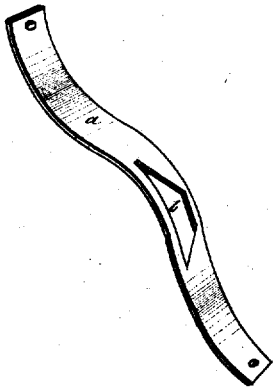

In the drawings, Figure 1 is a vertical section of the saw and rib *a*, with the flange or projection *b*. Fig. 2 is a perspective view of the rib *a* and flange *b* on the face of the rib near to one edge. Fig. 3 is a perspective view of the rib with the flange *b* on the middle of the face of the rib.

The rib *a* may be constructed in the usual manner, only placed a little deeper in the saws than usual, where the seed is discharged and where the flange *b* is located. The lower end of the flange *b* should extend a short distance below the point where the seed is discharged, and below the lower end of the hopper-board *c*. The flange *b* is a little more than one-eighth of an inch thick, and about one-half inch deep, more or less, and of any desired length. The flange *b* may be extended on the rib *a* to the point where the saw meets the rib at the top, or a second flange, *b*, may be placed at that point. By either of these arrangements the flange prevents the saws from being dulled by hulls, stems, &c., in poorly-picked cotton, and cotton having longer staple than usual can be ginned without breaking the fiber. When two flanges, *b*, are used, one near the bottom and one near the top, I construct them about two and one-half inches in length, more or less. The rib may be made thin at the place where the flange is put on, and of sufficient width to be strong enough for practical purposes, and thereby serve for rib and flange at the same time. The flange may be placed about the middle of the face of the rib when the seed are small, as shown in Fig. 3, otherwise near one edge, as shown in Fig. 2. The flanges are cast on the ribs, or otherwise attached to them. These ribs can be applied to gins in which the cotton is fed to the saws above them, and in the same roll-box where the lint is stripped from the seed by the teeth of the saws.

The operation of my gin is as follows: The cotton is fed into the roll-box in the usual way above and upon the saws. The flanges keep the seed in contact with the saws until the lint is taken off, when the seed will glide down between the flanges and the saws, the flanges at the same time preventing the roll in its upward motion from carrying the seed back into the box. By this method the seed are discharged more freely than usual. When long staple cotton is ginned, the flange at the top of the rib prevents two saws from acting on one seed at the same time, so that the fiber will not be broken by the saws. It is proper to remark that I use but one roll-box, like the Whitney gin, into which box or hopper the cotton is fed.

I claim as my improvement—

The flange *b* on the face of the rib *a*, constructed, arranged, and operated in the manner described, for the purpose hereinbefore specified.

JOSEPH C. DU BOIS.

Witnesses:

W. B. DENNETT,

J. A. MAULDIN.